Feb. 11, 1930.　　　V. BENDIX　　　1,746,924
BRAKE DRUM
Original Filed May 2, 1928
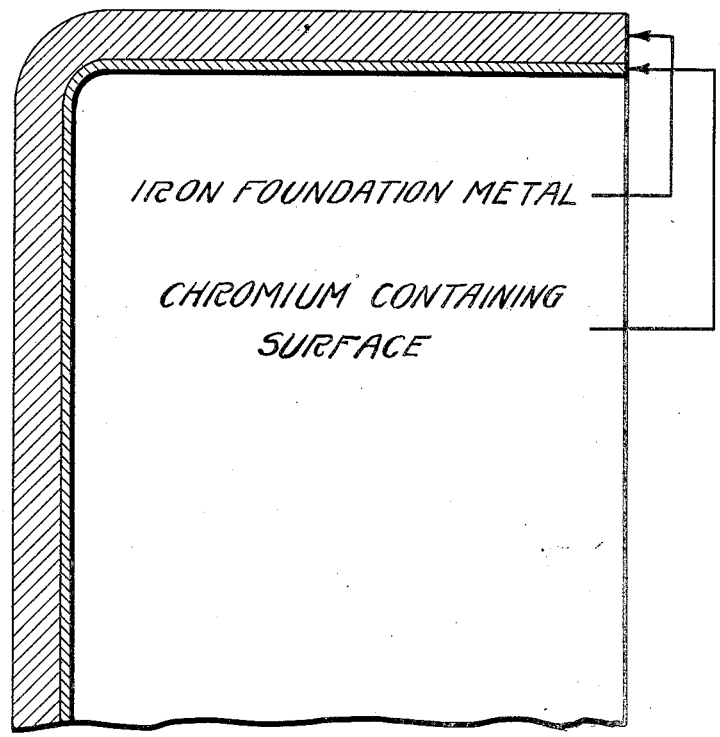

Patented Feb. 11, 1930

1,746,924

UNITED STATES PATENT OFFICE

VINCENT BENDIX, OF SOUTH BEND, INDIANA, ASSIGNOR TO BENDIX BRAKE COMPANY, OF SOUTH BEND, INDIANA, A CORPORATION OF ILLINOIS

BRAKE DRUM

Original application filed May 2, 1928, Serial No. 274,677. Divided and this application filed February 20, 1929. Serial No. 341,512.

This invention relates to improvements in brake drums and is a division of prior application Serial No. 274,677, filed May 2, 1928, patented July 16, 1929, No. 1,720,815.

At the present time, brake drums are usually made from a low carbon steel and are of pressed formation. As this ferruginous base metal corrodes, not only does it become unsightly, but it also becomes seriously weakened, by reason of the fact that the iron of relatively high tensile strength is replaced by a deposit of non-adherent iron oxide, which possesses substantially no strength. During use, this corrosion or oxidation is accelerated under the catalytic effects of generated frictional heats. Upon continued use, the drum tends to distort and lose its initial circular shape. This eccentricity materially lowers the strength, and hence accentuates this distortion.

A major object of this invention is to provide a structural material particularly well adapted to use in brake drums which is of low corrodibility and desirable high tensile strength.

Another object of the invention is to provide a brake drum having frictional engaging surfaces of high tensile strength, low corrodibility and hardness.

Another object is to provide a novel composite brake drum structure of a ferruginous material and another metal.

The availability, ease of manufacture and machining, and the relative cheapness of low carbon steel, recommends itself to use in brake drum structures. This steel, however, is relatively easily corroded. When used in a brake mechanism of the internal expanding type, the interior braking flange becomes liable to corrosion and particularly when the friction material contains corrosive agencies. This corrosion, as it known, consists of oxidation of the iron and is greatly accelerated at the braking flange by reason of the frictional heats. Such corrosion is practically cumulative; the iron oxide which is formed not only does not provide a protective coating but in point of fact accelerates subsequent corrosion or oxidation of the underlying body.

The disadvantages of the ordinary steel structures may be largely overcome by manufacturing a drum from chromium, vanadium, zirconium or other alloy steel. These materials not only are characterized by extremely low corrodibility, but are also of a high tensile strength. While these materials do present major advantages, they are considerably more expensive than the ordinary steel employed. According to the purpose of this invention, a brake drum may be produced which is formed with a braking flange so treated as to present lower corrosion characteristics and increased tensile strength.

The invention, therefore, comprehends the treatment of the interior braking flange with chromium so as to incorporate a sufficient amount of this metal in the braking flange to thereby lower its corrodibility and increase its strength.

The single figure on the drawing is a diagrammatic illustration of a drum produced according to the invention.

As pointed out in the application above referred to, a surface of chromium may be plated on the interior peripheral braking flange so as to present a surface of low corrodibility and to impart increased strength to the structure.

While a chromium plated drum provides an improved structure, it is sometimes desirable, as where the friction material on the internal expanding brake contains corrosive agents or where the interior of the brake itself is subjected to corrosion, to increase the corrosion resistance of this flange while at the same time imparting to it a coefficient of friction greater than, or at least equal to, that of ordinary steel. A continuous plate of chromium will present a relatively low coefficient of friction and hence will not present as great a retarding effect when associated with a given friction material as a roughened surface.

The advantages of increased resistance to corrosion and increased frictional resistance may be obtained by incorporating chromium or a similar metal into the friction surface by a method which will tend to obtain a roughened surface.

In the preferred embodiment, the brake drum which is to be treated may first be thoroughly cleaned and then packed in a container with a suitable chromizing mixture such, for example, as approximately fifty-five parts of chromium powder, and forty-five parts of alumina. The chromizing treatment, as will be understood, can be localized to any desired area. If the drum is to be employed with an internal expanding brake, the interior braking flange may be chromized. If it is desired to obtain a drum having low corrosion characteristics throughout, the entire surface may be treated.

As pointed out in the prior application, the container in which the chromizing process is carried out may be heated in vacuo or an atmosphere of a relatively inert or non-oxidizing gas such as hydrogen. Since the material which is to be treated consists of a low carbon steel, it is not generally necessary to first decarburize the surface which is to be chromized.

The chromizing treatment may be continued for about four hours more or less in the neighborhood of 1350° C. During this treatment, the chromium alloys with the iron in such a manner as to cement the treating metal to the base metal. The resulting chromized surface will resist corrosion as well as sherardized iron, and in addition possesses superior tensile and torsional strength. It likewise presents an advantage over the plated drum because of the fact that the finished surface is not as continuous, that is to say, as clear grained and smooth, as a plated surface. This roughened surface, therefore, will have a higher coefficient of friction than a smoother surface. If it is desired, this roughness may be increased by suitable treatment.

If desired, the chromizing treatment may be used with a cast iron drum structure. In such a case, the face of the mold may be covered with a paste comprising powdered ferrochromium and a suitable binder, such as sodium silicate. When the molten metal is poured into the mold, it alloys to a considerable extent with the chromium surface. It will be noted that the resulting drum presents a braking surface which is of low corrodibility, increased strength and hardness, and of a relatively high coefficient of friction.

While I have described a particular embodiment of the invention, it is to be understood that this is given purely by way of example; the metal chromium is to be taken as indicative of any other metal which will combine with the iron in a comparable manner to form a surface of low corrodibility and high coefficient of friction. Since, therefore, the invention is susceptible of wide modification and range of choice as to the particular materials used, I do not intend it to be limited to that described, except as such limitations are clearly imposed by the appended claims.

I claim:

1. A chromized brake drum.

2. A brake drum comprising a ferruginous foundation metal having a surface into which chromium is diffused.

3. A brake drum comprising a ferruginous foundation metal having a braking surface so treated as to increase its coefficient of friction.

4. A brake drum comprising a ferruginous foundation metal having a chromized friction surface.

5. A brake drum comprising a ferruginous foundation metal having a braking surface of a high coefficient of friction comprising an alloy of the foundation metal.

6. A brake drum comprising a ferruginous foundation metal having a braking flange of lower corrodibility and higher coefficient of friction than the remainder of the drum.

7. A pressed steel brake drum comprising a ferruginous foundation metal having a chromized friction surface.

In testimony whereof I have hereunto affixed my signature.

VINCENT BENDIX.